T. H. COULTER.
METALLIC RESILIENT WHEEL.
APPLICATION FILED AUG. 7, 1911.
1,037,446.
Patented Sept. 3, 1912.
2 SHEETS—SHEET 1.
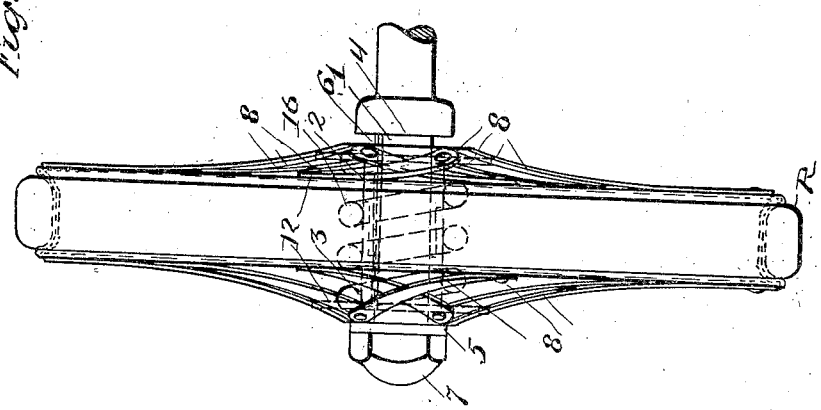
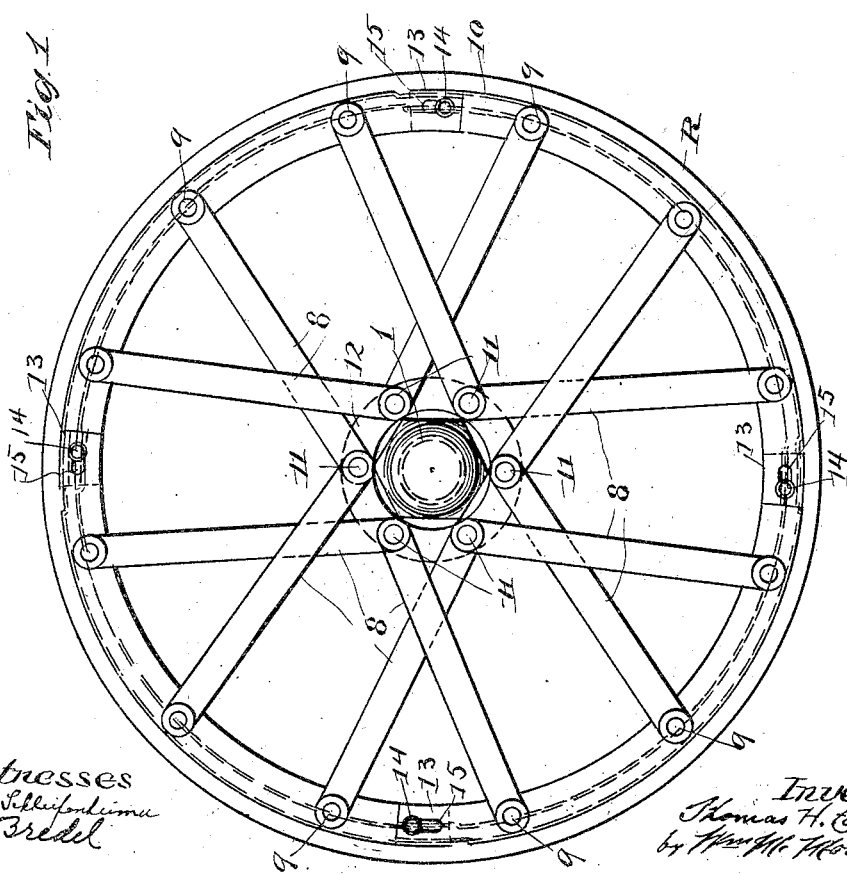

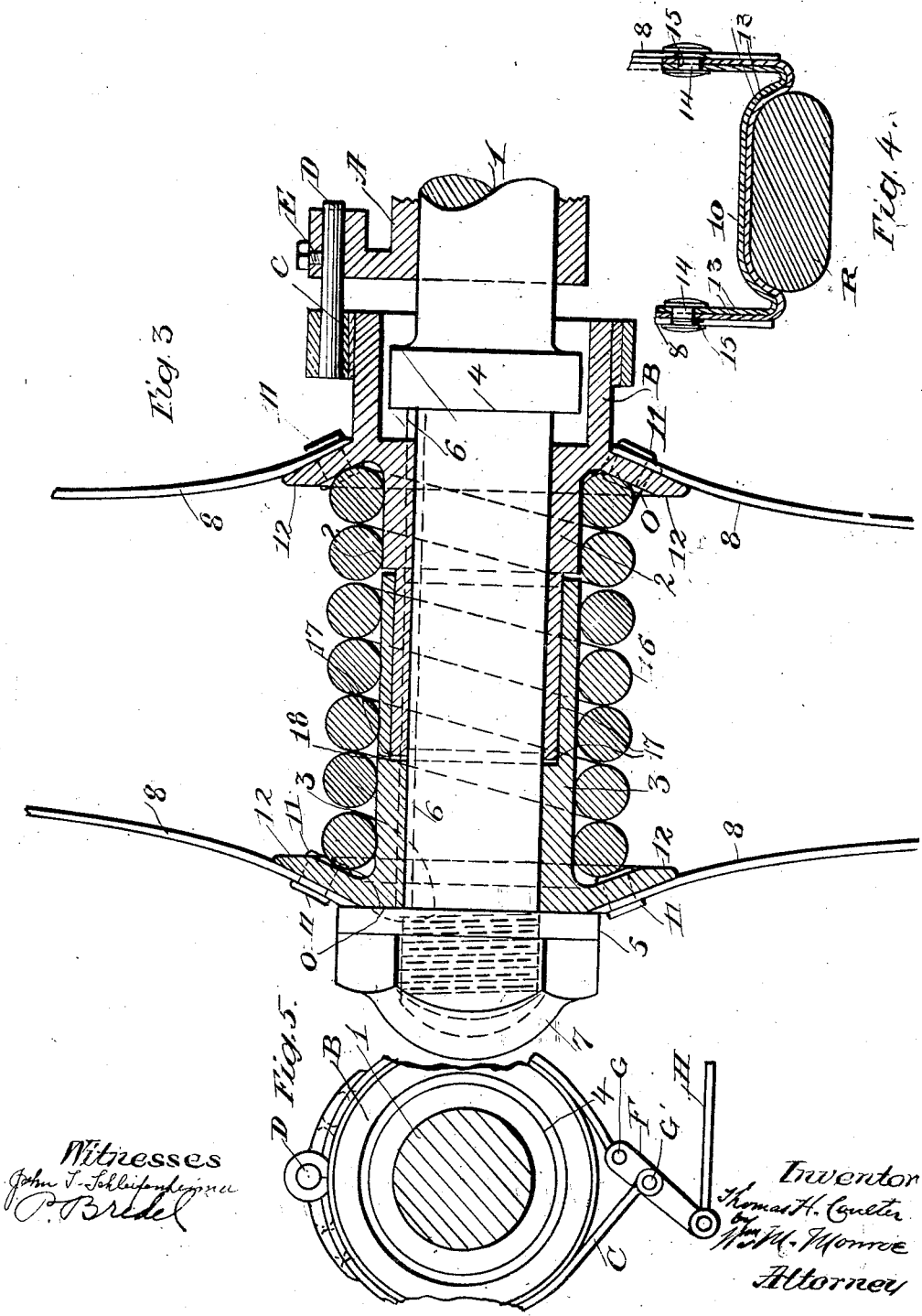

UNITED STATES PATENT OFFICE.

THOMAS H. COULTER, OF CLEVELAND, OHIO, ASSIGNOR OF ONE-HALF TO JOHN T. SCHLEIFENHEIMER.

METALLIC RESILIENT WHEEL.

1,037,446.  Specification of Letters Patent.  Patented Sept. 3, 1912.

Application filed August 7, 1911. Serial No. 642,686.

*To all whom it may concern:*

Be it known that I, THOMAS H. COULTER, a citizen of the United States, and resident of Cleveland, in the county of Cuyahoga and State of Ohio, have invented certain new and useful Improvements in Metallic Resilient Wheels, of which I hereby declare the following to be a full, clear, and exact description, such as will enable others skilled in the art to which it appertains to make and use the same.

The objects of the invention are to provide resilient means for securing the metallic spokes of an automobile or other wheel employed in the running gear of a motor vehicle upon the hub so that the spokes will yield laterally at the hub and also to employ spokes capable of bending laterally to form a resilient support for the hub.

The invention also includes a separable form of hub, one portion sleeved over another and a coiled spring thereon adapted to retain the hub sections closely together against the pressure of the spokes. An air cushion is also provided to prevent the hub sections from striking against each other violently when the pressure is released.

The invention comprises the combination and arrangement of parts and construction of details, hereinafter described, shown in the accompanying drawings and specifically pointed out in the claims.

In the accompanying drawings Figure 1 is a side elevation of the wheel; Fig. 2 is an edge elevation thereof; Fig. 3 is an enlarged longitudinal central section of the hub showing the contracting spring and the pneumatic chamber. Fig. 4 is a transverse section of the rim and tire, and Fig. 5 is a transverse section of the axle showing the brake.

In these views 1 is the axle of the wheel, 2 and 3 are the hub sections, the inner ends of which overlap and are slidingly movable in a longitudinal direction upon the axle, their movements being limited by the inner shoulder 4, on the axle, and the outer ring 5 secured upon the outer end thereof. A spline 6 prevents the rotation of the wheel when the axle is employed for a driving axle. The outer clamping or cap nut 7 completes the construction of this part.

8, 8 are the spokes preferably formed of band steel and while rigid enough to sustain the load upon the wheel are flexible enough in one direction, that is longitudinal of the axis, to yield under the load sufficiently to protect the engine and transmission gear from excessive vibration and to cushion the car for ease in riding. The outer ends of the spokes are pivotally attached at 9, 9 to the rim 10 and the spokes are preferably arranged in pairs the spokes in each pair crossing each other near the hub, and their inner ends are pivotally attached at 11, 11 to the flanges 12, 12 on the respective hub sections 2 and 3. The rim 10 may be divided between as many of the spokes as may be desired, so that they will be permitted to spread apart slightly at their outer ends to facilitate the outward spreading of the spokes. When divided in this manner the ends of the sections overlap at 13, 13 and are slidingly secured together by means of pins or rivets 14, 14 in the short slots 15, 15. Upon the recessed faces of the rim sections is secured the rubber tread R. Upon the divided hub is sleeved a contractile spring 16 the extremities of which are attached at O to the flanges 12, 12 of the respective hub sections. The action of the spring is always to tend to draw the hub sections closely together against the spreading action of the spokes and serves to control the amount of resiliency of the wheel since a spring of any desired strength can be employed, and the relation between the amount of resiliency of the spokes and that of the spring can be worked out to accommodate the load the wheel is designed to carry. The cushion formed by compressed air is formed at 17 between the reduced inner end of the part 2 of the sleeve, and the shoulder formed at the inner end of the part 3 which telescopes over the other portion. A small hole 18 permits the air to gradually escape but not quickly enough to prevent the elastic pressure from the compressed air.

In Fig. 3 is shown a brake attachment adapted for use on one of the rear axles. Here A is a part of the frame, B is an annular projection from the inner end of the inner hub section. C is a strap brake slidingly mounted upon a rod D which is preferably secured in the frame at E parallel with the axle 1. The strap brake is operated by means of the lever F secured to the ends of the strap at G, G' in the usual manner, and provided with an operating rod H. In use the brake is frictionally engaged with the projection B and moves with it sliding upon the rod D.

Having described the invention what I claim as new and desire to secure by Letters Patent is:

1. In a resilient metal wheel, the combination with an axial member, of flanged overlapping hub sections longitudinally movable on said axial member, a retractile coiled spring connecting said flanged hub sections and adapted to tend to draw them together, a wheel rim, and crossed spokes secured to said flanged hub sections, and to said rim, said rim divided between some of said spokes.

2. The combination in a metallic resilient wheel for a vehicle of a sectional rim, the sections thereof slidable on each other, a hub formed in overlapping sections slidable on each other, each hub provided with a flange on its outer end, a contractile spring over the hub, adapted to tend to draw the sections together, yielding spokes arranged to cross each other at an angle, and secured to the rim sections at their outer ends and to the said flanges at their inner ends, the said spokes adapted to spread outwardly at their inner ends to separate said hub sections and at their outer ends to separate said rim sections when the weight of the vehicle comes upon them.

3. The combination with a sectional rim, the said sections overlapping and slidingly movable upon each other, of a hub comprising two sections overlapping and slidingly movable upon each other, a device tending to draw said sections together, and resilient spokes, pivoted to said hub sections, said spokes arranged in pairs, and crossing each other and the outer ends of two pairs of spokes pivoted in adjoining rim sections.

4. The combination in a metallic resilient wheel for a vehicle of a sectional rim, the sections thereof having overlapping ends slidable on each other, an axle, a hub formed in overlapping sections, each section provided with a flange, the said sections shouldered at adjacent ends to form an air chamber about said axle, the outer hub section perforated for air admission, a series of crossed spokes pivoted to said flanges, and the spokes of two pairs pivoted to adjoining rim sections, means for securing said hub sections elastically together, and means for securing said rim sections slidably together.

5. The combination in a metallic resilient wheel for a vehicle, of an axle, hub sections slidingly movable on said axle and one section sleeved over the other section and forming an air chamber therebetween, the outer section perforated for communication between said air chamber and the outer air, resilient means tending to draw said sections together, resilient spokes secured to the outer edges of said hub sections, and a metallic rim to which the outer ends of the spokes are sleeved.

In testimony whereof, I hereunto set my hand this 5th day of July 1911.

THOMAS H. COULTER.

In presence of—
Wm. M. Monroe,
P. Brede.